United States Patent [19]
Epple et al.

[11] Patent Number: 5,612,434
[45] Date of Patent: Mar. 18, 1997

[54] COPOLYMERS COMPRISING CYCLIC OR POLYCYCLIC MONOMERS HAVING A SPECIFIC ISOMER DISTRIBUTION, METHODS FOR THEIR MANUFACTURE, AND THEIR USE

[75] Inventors: Ulrich Epple; Holger Schmidt, both of Wiesbaden; Gerhard Brindoepke, Sulzbach; Karl-Friedrich Doessel, Wiesbaden, all of Germany

[73] Assignee: Hoechst Aktiengesellschaft, Frankfurt, Germany

[21] Appl. No.: 538,216

[22] Filed: Oct. 3, 1995

[30] Foreign Application Priority Data

Oct. 7, 1994 [DE] Germany ............. 44 35 950.0

[51] Int. Cl.$^6$ .......... C08F 10/14; C08F 224/00; C08F 232/00
[52] U.S. Cl. .......... 526/282; 526/273; 526/284; 526/309; 523/336
[58] Field of Search ............. 526/273, 308, 526/309, 282, 284

[56] References Cited

U.S. PATENT DOCUMENTS

| | | | |
|---|---|---|---|
| 3,959,234 | 5/1976 | Kurosawa et al. | 526/308 |
| 4,529,656 | 7/1985 | Haigh et al. | 428/402 |
| 4,710,556 | 12/1987 | Plum | 526/273 |

FOREIGN PATENT DOCUMENTS

| | | |
|---|---|---|
| 2048444 | 2/1992 | Canada . |
| 2064292 | 10/1992 | Canada . |
| 2064290 | 10/1992 | Canada . |
| 2073031 | 1/1993 | Canada . |
| 2073115 | 1/1993 | Canada . |
| 2120416 | 10/1994 | Canada . |
| 2128551 | 1/1995 | Canada . |
| 2128657 | 2/1995 | Canada . |
| 2134043 | 4/1995 | Canada . |
| 0171847 | 2/1986 | European Pat. Off. . |
| 0299420 | 1/1989 | European Pat. Off. . |
| 0657483 | 6/1995 | European Pat. Off. . |
| 569977 | 2/1959 | Germany . |

Primary Examiner—Tae Yoon
Attorney, Agent, or Firm—Foley & Lardner

[57] ABSTRACT

Copolymers of olefinically unsaturated monomers, wherein at least one of the monomers is an isomer mixture of a cyclic or polycyclic olefinically unsaturated compound, which mixture contains a mass fraction from 8 to 50 per cent of at least one isomer of the main component in addition to this main component. The copolymers are useful, for example, in coating compositions.

32 Claims, No Drawings

COPOLYMERS COMPRISING CYCLIC OR POLYCYCLIC MONOMERS HAVING A SPECIFIC ISOMER DISTRIBUTION, METHODS FOR THEIR MANUFACTURE, AND THEIR USE

BACKGROUND OF THE INVENTION

In recent times, the development of new coating materials in the automotive, plastics, wood products, and industrial sectors has been directed toward two principal objectives: reducing the solvent emissions, and avoiding waste.

Accordingly, in the development of new coating materials, particular preference is given to modern coating compositions, such as high-solids, aqueous systems, and powder coatings.

The front runners in these trends in development are usually motor-vehicle manufacturers and the associated refinish trade. The four-coat automotive OEM finish employed nowadays consists of an aqueous cataphoretic deposition coating to provide protection against corrosion, an aqueous or solvent-containing filler for protection against stone chipping, an aqueous metallic basecoat for coloring and/or for the metallic effect, and a solvent-containing—usually high-solids, aqueous or powder—clearcoat which gives the coating the necessary gloss and resistance to water, chemicals and the effects of weathering.

It is the filler, basecoat and clearcoat coats in particular which are currently the subject of intensive research efforts, as described for example in documents DE-A 43 24 801, DE-A 41 22 265, DE-A 41 22 266, DE-A 43 36 206, DE-A 43 42 384, DE-A 43 26 656, DE-A 44 15 319, DE-A 43 11 128, EP-B 0 056 971, EP-A 0 509 392, and EP-A 0 509 393.

As regards the topmost coat, the clearcoat, there is competition between all three modern coating compositions, and in comparison each of these coating systems displays strengths and weaknesses both in application and in use. This final coat usually consists of acrylate copolymers, since these are very weatherproof. For high-solids binders these copolymers are of low molecular weight formulation; for aqueous binders they are usually neutralized and dispersed in water or, for powder binders, produced in pulverulent form. These acrylic resins are acrylate copolymers with or without styrene, which, depending on the crosslinking reaction (curing in each case includes melamine crosslinking, isocyanate cross-linking (blocked or unblocked), carboxyl cross-linking, epoxy cross-linking, etc., or any desired combinations thereof), contain appropriate functional groups.

Styrene as an aromatic vinyl monomer possesses the function of "hardening" (increasing the glass transition temperature) and of making the products less expensive. A disadvantage, however, is the reduction in weathering stability as the content of styrene increases. Efforts are therefore directed at limiting the content of styrene and employing other "hard and weather-resistant" monomers which lead to as a high as possible a glass transition temperature in the resin. What are desired, therefore, are products comprising appropriate monomers which possess as small a free volume as possible.

Monomers which are suitable are specific aliphatic acrylic esters which are sterically hindered, i.e., which possess either a branched or a (poly)cyclic structure in the side chain. These monomers have a "hardening" effect, since their homopolymers have glass transition temperatures of more than 45° C, measured at a sufficiently high molar mass of the homopolymer at which there is no longer dependency of the temperature of the glass transition stage on the molar mass.

An acrylic monomer having a particularly high glass transition temperature is isobornyl acrylate or methacrylate. Conventionally, it can be prepared over two steps by trans-esterifying methyl methacrylate or methyl acrylate with isoborneol, or by esterifying the alcohol with methacrylic acid/acrylic acid or chlorinated derivatives thereof. The first step in this case is the preparation of the isoborneol by the acid-catalyzed reaction of water with camphene.

More recent methods for the preparation of these monomers in one step start directly from the precursor camphene and from methacrylic or acrylic acid, which are reacted on an acid ion exchanger which, in suspension, fills the reactor uniformly. (See U.S. Ser. No. 462.701, filed Jun. 5, 1995, hereby incorporated by reference.).

By setting the reaction parameters, this method leads to intensified rearrangement reactions on the camphene skeleton (Wagner-Meerwein rearrangements), which are able to produce relatively large quantities of structural isomers of isobornyl (meth) acrylate, such as pseudobornyl (meth)acrylate and isofenchyl (meth)acrylate.

The proportions by mass of the individual structural isomers, acrylates or methacrylates, according to the new 1-step process as compared to the 2-step process are:

|  | Process | |
|---|---|---|
| (Meth)acrylate | 1-step (new) | 2-step |
| Isobornyl | 50–92% | 92–99.9% |
| Isofenchyl | ≧3.5% | <3.5% |
| Pseudobornyl | ≧1% | <1% |

SUMMARY OF THE INVENTION

It is an object of the present invention to provide copolymers having properties useful in coating composition such as having high glass temperature.

It is also an object of the invention to provide coating compositions especially suitable for use in modern processes.

It is also an object of the invention to provide methods of making and using such copolymers and coatings.

In accordance with these objectives, the present invention provides a copolymer of olefinically unsaturated monomers, wherein one of the monomers is an isomer mixture of esters of isobornyl alcohol with an $\alpha,\beta$-olefinically unsaturated acid, the content of isoborneol in the isomer mixture being between 50 and 92%, that of isofenchyl alcohol being from 3.5% to 49% and that of pseudobornyl alcohol being from 1% to 46.5%.

The present invention also provides methods of preparing the above-described copolymer and coating compositions, especially for automotive refinish, especially for refinish fillers and automotive refinish topcoats, which include the above-described copolymer.

Further objects, features, and advantages of the invention will become apparent from the detailed description of preferred embodiments that follows.

DETAILED DESCRIPTION OF THE PREFERRED EMBODIMENTS

Usually, polymers of monomers comprising isomer mixtures exhibit lower glass transition temperatures than the respective polymers formed from isomerically pure monomers.

Surprisingly, however, the present inventors have found that, by using such monomers having a "relatively broad" isomer distribution, it is possible to prepare acrylic polymers of reduced free volume which have a glass transition temperature which is higher by up to 15° C. at comparable molar masses and molar mass distributions. The mass fraction if isobornyl esters of α,β-unsaturated acids in the isomer mixture is from 50 to 92%, preferably from 50 to 90%, and particularly preferred between 50 and 88%. The mass fractions of isofenchyl esters are accordingly from 3.5 to 49%, preferably from 4 to 48.5%, and particularly preferred from 4.5 to 48%; those of pseudobornyl esters are from 1 to 46.5%, preferably from 1.5 to 46%, and particularly preferred from 2 to 45.5%. These new acrylic polymers, therefore, need not contain styrene, or only a reduced amount thereof, in order to increase the glass transition temperature, and are therefore more resistant to weathering. An isomer distribution is called "relatively broad" if it contains a mass fraction of 8 to 50% of at least one isomer in addition to the main component.

In the case of 1-component coating materials, whether conventional or aqueous, this leads to even higher pendulum hardnesses ("film hardnesses") with high weather resistance. The above-mentioned advantages are also evident in powder coatings, where flowability even at relatively high temperatures ("blocking resistance") can be better assured using such acrylic resins.

Copolymers according to the invention are particularly suitable for coatings applications in 2component systems, especially in high-solids systems. The higher glass stages of the acrylic resins in the high-solids system lead to more rapid freedom from tack at room temperature and at moderate curing temperatures. The provision of very high-solids coating systems with this isomer distribution of isobornyl (meth)acrylate is thereby possible, since the binders can be given an even lower molecular weight formulation for the same glass transition temperature.

It is known that acrylic binders can be prepared by polymerization in the absence of solvent. Generally, one component, for example a glycidyl ester or a maleate, is introduced at the beginning of polymerization. This ester or, respectively, monomer is subsequently incorporated completely into the copolymer during polymerization with the addition of monomers (in the case of the maleate, further monomers). See (DE-A 43 26 656, DE-A 44 15 319, DE-A 43 11 128, EP-B 0 056 971, EP-A 0 509 392 and EP-A 0 509 393).

Since the copolymers of the invention are distinguished by the structural isomer distribution of cyclic monomers, especially isobornyl (meth)acrylate, and not by their preparation process, any type of process can be used to make the copolymers, including solvent or mass polymerization can be employed to prepare the binders according to the invention.

This invention relates to copolymers of olefinically unsaturated monomers, wherein at least one of the monomers is an isomer mixture of a cyclic or polycyclic olefinically unsaturated compound, which mixture contains from 8 to 50% of at least one isomer of the main component in addition to this main component.

Such cyclic structures include those derived from mono- and polycyclic terpene hydrocarbons, such as menthane, terpinene, phellandrene, limonene, carane, pinane, camphane. These cyclic compounds may contain olefinic unsaturation within their basic skeleton, or may be substituted with alkene groups of two to ten carbon atoms.

The invention therefore relates to all copolymers which comprise moieties derived from cyclic or polycyclic olefinically unsaturated monomers, preferably esters of aliphatic cyclic or polycyclic alcohols and α,β-unsaturated acids, especially isobornyl (meth)acrylate and structural isomers thereof in a "relatively broad distribution", independently of the preparation process, the application form and the intended use.

The term copolymers is intended to embrace all polymers which comprise polycondensation products or polyaddition products.

This term is also understood to include polyurethanevinyl hybrid dispersions as described in patents DE-A 41 22 265, DE-A 41 22 266, DE-A 43 36 206, and DE-A 43 42 384.

All subsequent mention of parts, proportions and contents, including those in percent, denote proportions and contents by mass, unless specified otherwise.

In a preferred embodiment, the invention relates in particular to acrylate copolymers having an OH number of from 40 to 250 mg of KOH/g, an acid number of greater than 1 mg of KOH/g and a solution viscosity of from 10 to 2000 mPa.s (measured in a 50% strength solution at 23° C. in accordance with DIN 53018).

These OH-containing copolymers (1) can be obtained by the free-radical polymerization of (1A) from 3 to 50%, preferably 5 to 45%, particularly preferred 7 to 40%, of glycidyl esters or glycidyl ethers, preferably glycidyl esters of aliphatic saturated monocarboxylic acids containing a tertiary or quaternary α carbon atom, and (1B) from 97 to 50%, preferably 95 to 55%, particularly preferred 93 to 60%, of at least two olefinically unsaturated copolymerizable monomers of which at least one comprises at least one COOH group, which is equimolar with or in molar excess over (1A), and at least one of which is an isomer mixture of the cyclic monomer.

In this case, the carboxyl-bearing molecules (monomers or polymers) react with the glycidyl esters with ring opening of the oxirane group and ester formation. This "carboxy-epoxy" reaction may take place with or without catalysis. Catalysts which can be employed include alkali or alkaline earth metal compounds and transition metal compounds, examples being salts of Na, Li, K, Ca, Zr, V, Ti, Sn, or Zn.

The term cyclic monomers is understood as referring to monomers of cyclic or polycyclic structure which may possess substituents of any kind.

Some of the resulting hydroxyl-containing copolymers have high acid numbers, while nevertheless possessing low solution viscosities.

These acrylic polymers lead, in a finished coating formulation, to high-solids, 1-component or 2-component coating compositions.

A high solids coating composition is one which contains a mass fraction of at least 50% of solids.

In order to prepare water-dilutable polyacrylates, the acrylate copolymers prepared by this method and having low or normal solution viscosities are diluted in a water-dilutable organic auxiliary solvent, partially or completely neutralized, and diluted normally or in inverse form with water.

By means of appropriate curing components and additives, the water-diluted polyacrylate resins obtained in this way are used to produce, for example, water-thinnable coating materials which are stoved (1 component) or formulated as a 2-component coating material.

As component (1A) it is preferred to employ glycidyl esters of α-alkylalkanemonocarboxylic acids and/or α,α-dialkylalkanemonocarboxylic acids, individually or in a mixture.

The compounds according to (1A) are selected, for example, from the glycidyl esters of 2,2-dimethylpropionic acid, 2,2-dimethylundecanoic acid and the neo acids, such as neohexanoic acid, neononanoic acid and neodecanoic acid. In this context, the alkyl radicals may also possess a different number of carbon atoms.

In general, the overall number of carbon atoms in the starting monocarboxylic acids for the glycidyl ester is between 4 and 30, in particular between 5 and 20.

Component (1B) preferably comprises a mixture of (1B1) one or more olefinically unsaturated monomers containing at least one —COOH group, and (1B2) one or more olefinically unsaturated monomers having a mono- or polycyclic structure, which possess a high proportion of structural isomers, and, if desired, one or more of components (1B3) to (1B5), namely (1B3) one or more hydroxyalkyl esters of α,β-unsaturated carboxylic acids, (1B4) one or more esters of an α,β-unsaturated carboxylic acid with a monohydric aliphatic alcohol of 1 to 20 carbon atoms, and (1B5) one or more olefinically unsaturated compounds which do not come under (1B1), (1B2), (1B3), or (1B4).

Any components or mixtures of components (1B1)–(1B5) can be used. The compounds according to (1B1) are selected, for example, from the acidic acrylic monomers, such as acrylic and methacrylic acid, maleic, fumaric and itaconic acid and the half-esters thereof, and crotonic acid, isocrotonic acid and vinylacetic acid.

Both in (1B1) and in the components (1B2) to (1B5) mentioned after it, the term "α,β-unsaturated carboxylic acids" includes dicarboxylic acids such as, for example, maleic acid, fumaric acid and itaconic acid, and their half-esters.

The compounds according to (1B2) are monomers, containing at least one C—C double bond and a cyclic structure, which comprise a high proportion of structural isomers. The term cyclic structure is understood below as referring to all mono- and polycyclic structures. Compounds which are preferably employed are isobornyl methacrylate or isobornyl acrylate, with structural isomers such as pseudobornyl methacrylate or acrylate and isofenchyl methacrylate or acrylate.

The hydroxyalkyl esters according to (1B3) include mono- or half-esters of α,β-unsaturated monocarboxylic acids with aliphatic polyols or diols having 2 to 30, in particular 2 to 20, carbon atoms. Examples of half-esters containing a primary hydroxyl group are hydroxyethyl acrylate, hydroxypropyl acrylate, hydroxybutyl acrylate, hydroxyamyl acrylate, neopentylglycol monoacrylate, hydroxyhexyl acrylate, hydroxyoctyl acrylate and the corresponding methacrylates. Examples of hydroxyalkyl esters which can be used and which contain a secondary hydroxyl group are 2-hydroxypropyl acrylate, 2-hydroxybutyl acrylate, 3-hydroxybutyl acrylate and the corresponding methacrylates. It is also possible in each case to employ the corresponding esters of other α,β-unsaturated carboxylic acids such as, for example, those of crotonic acid, isocrotonic acid and vinylacetic acid.

Other compounds which are equally suitable include the reaction products of one mole of hydroxyethyl acrylate and/or hydroxyethyl methacrylate and on average two moles of ε-caprolactone. Other suitable hydroxyl-containing esters are derived from the α,β-unsaturated carboxylic acids and the oligomeric alkylene glycols, such as oligoethylene and oligopropylene glycol, having molar masses of up to 1000 g/mol. Further suitable compounds are half-esters of α,β-unsaturated monocarboxylic acids with cycloaliphatic diols such as 1,4-cyclohexanedimethanol, 3(4),8(9)-bis(hydroxymethyl)tricyclo[5.2.1.0$^{2,6}$]decane or dihydroxy aromatic compounds, such as pyrocatechol, hydroquinone and bisphenol A. Also suitable are monoesters of aliphatic and aromatic polyols, such as glycerol mono(meth)acrylate, or mono(meth)acrylates of sorbitol, pentaerythritol or glycosides.

The compounds according to (1B4) are selected, for example, from esters of α,β-unsaturated monocarboxylic acids with aliphatic, monohydric, branched and unbranched alcohols of 1 to 20 carbon atoms, such as methyl, ethyl, n-butyl, isobutyl, tert-butyl, 2-ethylhexyl, hexyl, lauryl, stearyl, isopropyl and 2-amyl acrylate or methacrylate. Also suitable are esters of these alcohols with, for example, crotonic acid, isocrotonic acid or vinylacetic acid. Particular preference is given to methyl acrylate, n-butyl acrylate and the corresponding methacrylates.

The compounds according to (1B5) are selected, for example, from the group of esters of acrylic and methacrylic acid with halogenated alcohols, such as, for example, trifluoroethyl, pentafluoro-n-propyl and hexachlorobicycloheptenyl acrylate, the esters of halogenated acrylic acids, such as methyl 2-fluoroacrylate or dibromophenyl 2-fluoroacrylate, the vinyl esters, such as vinyl acetate or Versatic acid vinyl ester, the halogenated vinyl compounds, such as vinyl chloride, vinylidene chloride and vinylidene fluoride, and the halogenated aromatic vinyl compounds, such as chlorostyrene. This group also includes all the compounds mentioned under (B1) to (B4) which additionally are halogen-substituted.

The compounds according to (1B5) also include glycidyl esters of acrylic or methacrylic acid, preferably glycidyl acrylate and glycidyl methacrylate, and diglycidyl maleate or diglycidyl fumarate.

Compounds according to (1B5) also include monomers which comprise silane groups. Typical examples of these monomers are acrylatoalkoxysilanes, such as γ-(meth)acryloyloxypropyltrimethoxysilane, γ-(meth)acryloyloxypropyltris(2-methoxyethoxy) silane, and vinylalkoxysilanes, such as vinyltrimethoxysilane, vinyltriethoxysilane and vinyltris(2-methoxyethoxy)silane. Corresponding acyloxysilanes are also included here.

Further compounds which can be mentioned by way of example for (1B5) are acrylamides, acrylonitrile and methacrylonitrile.

As an inexpensive standard monomer, styrene may be included as a constituent of components (1B5), but its use may be restricted or is omitted entirely in the present invention.

In the mixture of starting monomers, component (1B) preferably comprises a mixture of mass fractions of (1B1) from 1 to 50%, preferably from 3 to 45%, particularly preferred 5 to 40%, of an α,β-unsaturated monocarboxylic acid or dicarboxylic acid, preferably acrylic or methacrylic acid, maleic, fumaric or itaconic acid or half-esters thereof, or mixtures of these, (1B2) from 1 to 85%, preferably from 2 to 80%, particularly preferred 3 to 75%, of an olefinically unsaturated monomer having a cyclic structure and a high proportion of structural isomers, or mixtures of two or more such monomers, (1B3) from 0 to 45%, preferably from 5 to 45%, particularly preferred 10 to 40%, of a hydroxyalkyl ester or oligomeric hydroxy alkylene glycol ester of acrylic acid or methacrylic acid, or mixtures of two or more such esters, (1B4) from 0 to 60%, preferably 1 to 55%, particularly preferred 2 to 50%, of an ester of acrylic or methacrylic acid with a monohydric aliphatic alcohol, or mixtures of two or more such esters, (1B5) from 0 to 85%, preferably from 1 to 80%, particularly preferred 2 to 75%, of at least one olefinically unsaturated compound, as described above, the sum of the overall mass of components (1B) always being 100%, and the sum of the proportions by mass of the esters preferably being not more than 90%.

Particularly suitable monomers are (1B1) acrylic acid, methacrylic acid, maleic acid and fumaric acid, (1B2) isobornyl acrylate or methacrylate with high contents of pseudobornyl or isofenchyl acrylate or methacrylate, (1B3) hydroxyethyl, hydroxypropyl and hydroxybutyl esters of acrylic acid and methacrylic acid, and oligomeric propylene glycol esters of acrylic and methacrylic acid, (1B4) methyl, ethyl, butyl, pentyl, hexyl, lauryl and stearyl esters of acrylic and methacrylic acid, and (1B5) fluorinated and chlorinated acrylic esters, aromatic vinyl compounds such as styrene, fluorinated and chlorinated aromatic vinyl compounds, and monomers containing silane groups.

The invention also relates to acrylate copolymers having an epoxide number of from 0.1 to 20, a glass transition temperature of more than 30° C. and a melt viscosity of from 500 to 50,000 mPa.s measured at 170° C.

These epoxide-containing copolymers (2) may likewise be obtained by free-radical polymerization of mass fractions of (2A) from 0 to 60%, preferably 1 to 59%, particularly preferred 2 to 58%, of at least one diester of an α,β-olefinically unsaturated dicarboxylic acid having 1 to 20 carbon atoms in the ester group, and (2B) from 100 to 40%, preferably 99 to 41%, particularly preferred 98 to 42%, of at least three olefinically unsaturated copolymerizable monomers of which at least one is an aromatic vinyl compound and at least one either carries the glycidyl ester group directly or develops this group in the course of the reaction, and at least one is an isomer mixture of a cyclic monomer.

The resulting epoxide-containing copolymers usually have high glass transition temperatures.

In a finished coating formulation comprising corresponding dicarboxylic acids or anhydrides thereof or dicarboxylic polyanhydrides as curing agents and additives, these acrylic polymers lead to blocking-resistant powder coatings which are highly weather-resistant.

As components (2A) it is preferred to use diesters of an α,β-olefinically unsaturated dicarboxylic acid having 1 to 10 carbon atoms in the ester group, individually or in a mixture.

Examples of the compounds according to (2A) are dimethyl maleate, diethyl maleate, dibutyl maleate, diisopropyl maleate or the corresponding fumarates.

Component (2B) preferably comprises a mixture of (2B1) a limited proportion of aromatic vinyl compounds, (2B2) compounds according to (1B2), (2B3) one or more esters of an α,β-unsaturated carboxylic acid with glycidyl groups, such as diglycidyl maleate or fumarate, or glycidyl acrylate or methacrylate and, if desired, (2B4) compounds according to the type (1A), (1B1), (1B3), (1B4) or (1B5), or mixtures thereof.

One preferred embodiment of carrying out this invention consists in making the copolymer (2) by polymerizing at least three olefinically unsaturated compounds selected from (2B), where at least one compound of the class (2B1), at least one compound of the class (2B2), and at least one compound of the class (2B3) is present in the reaction mixture. Optionally, a compound of the class (2B4) may also be present. Optionally, a compound of the class (2A) may also be present. In an especially preferred embodiment, an ester of an epoxy group containing alcohol and an aliphatic saturated carboxylic acid with a tertiary or quaternary α-carbon atom may be added, either before, during or after the polymerization. This carboxylic acid may preferably have from 5 to 15, especially preferred from 5 to 11 carbon atoms.

In the mixture of starting monomers, component (2B) preferably comprises a mixture of mass fractions of (2B1) from 1 to 85%, preferably from 5 to 65%, of an aromatic vinyl compound or a mixture of two or more aromatic vinyl compounds, (2B2) from 1 to 85%, preferably from 2 to 50% of an olefinically unsaturated monomer having a cyclic structure and a high proportion of structural isomers, or a mixture of two or more such monomers, (2B3) from 1 to 60%, preferably from 3 to 45%, of an ester of an α,β-unsaturated carboxylic acid with glycidyl-containing alcohols, and from 0 to 90%, preferably from 1 to 70% of one or more of components (2B4).

Particularly suitable monomers are (2B1) styrene, α-methylstyrene and vinyltoluenes, (2B2) isobornyl acrylate or methacrylate, in each case with a high content of pseudobornyl and/or isofenchyl acrylate or methacrylate, (2B3) glycidyl acrylate or methacrylate and diglycidyl maleate or fumarate, and (2B4) hydroxyethyl, hydroxypropyl and hydroxybutyl acrylate or methacrylate, methyl, ethyl or n-or tert-butyl acrylate or methacrylate, 2-ethylhexyl acrylate or methacrylate and γ-(meth)acryloyloxypropyltrimethoxysilane.

The polymer (2) can be prepared in any desired manner. Depending on the nature of the monomers involved, appropriate process variants may be chosen.

A solventless polymerization process is preferred. Such process may consist of initially charging component (2A) or any of (2B), preferably (2B3), and subsequently adding the other components, either together, separately, or in combinations of two or more. Another variant is to initially charge a mixture of all components.

For the copolymers according to the invention, suitable polymerization initiators which may be used to prepare them include any desired of the conventional radical-forming compounds, individually or in a mixture. Examples of such compounds include aliphatic azo compounds, diacyl peroxides, peroxydicarbonates, alkyl per-esters, alkyl hydroperoxides, perketals, dialkyl peroxides or ketone peroxides. Preference is given to dialkyl peroxides, such as di-t-butyl peroxide or di-t-amyl peroxide, and alkyl per-esters, such as t-butyl peroxy-2-ethylhexanoate or t-amyl peroxy-2-ethylhexanoate. The proportion of initiators may, for example, be from 0.5 to 5%, preferably up to 4% and in particular up to 3%, based on the overall mass of the starting components.

The polymerization is preferably carried out essentially in the absence of solvent (as a bulk polymerization towards the end). The phrase "essentially in the absence of solvent" mean a polymerization which is in general carried out without solvents. In some cases, however, it is also possible for a small proportion of solvent to be present, i.e., up to 20%, preferably up to 10% and in particular up to 5%, based on the mass of the starting components. This polymerization may also be carried out under elevated pressure. However, it is preferred to operate without solvents.

The hydroxyl-, carboxyl- and/or epoxide-containing copolymers prepared can be modified further in an additional step, for example by reaction with isocyanate compounds. In this case the solvent which is employed in the polymerization, i.e., in the preparation of the polymers, should be inert with respect to these isocyanate compounds.

These isocyanate compounds also include, for example, all low molecular weight urea derivatives which lead in the coatings industry to "sag controlled" acrylic resins. For this purpose, for example, the copolymer is charged together with monoamine(s), and appropriate isocyanates are added.

The processes according to the invention can be carried out by a batchwise procedure (batch method) or continuously. In the multistep processes, another possible embodiment is one in which the respective reaction steps are carried out in separate vessels. It is also possible to carry out the reaction in the first step continuously and that in the second step by a batchwise procedure.

The copolymers (1) according to the invention are distinguished by their content of OH groups, which in general leads to a OH number of from 40 to 250, preferably from 60 to 200 and, in particular, from 70 to 170 mg of KOH/g, and by their content of acid groups, which in general leads to an acid number of more than 1, preferably from 3 to 70, and in particular, from 5 to 5d mg of KOH/g.

For the conventional high-solids coating materials, the polymers according to the invention which are employed possess a particularly low solution viscosity. In general it is in the range from 10 to 2000, preferably from 15 to 500 and in particular, from 20 to 150 mPa.s, measured in a 50% strength solution in butyl acetate at 23° C. in accordance with DIN 53018. The polymers typically possess average molar masses (number average) of less than 5000, preferably from 300 to 4500 and, in particular, from 500 to 4000 g/mol.

Examples of suitable solvents for the products obtained in accordance with the invention include aliphatic, cycloaliphatic and/or aromatic hydrocarbons, such as alkylbenzenes, for example xylene or toluene; esters, such as ethyl acetate, butyl acetate, acetates with relatively long alcohol residues, butyl propionate, pentyl propionate, ethylene glycol monoethyl ether acetate, the corresponding methyl ether acetate; ethers, such as ethylene glycol acetate monoethyl, methyl or butyl ether; glycols; alcohols; ketones, such as methyl amyl ketone, methyl isobutyl ketone; lactones or the like; or mixtures of such solvents.

For aqueous coating systems, the polymers are generally produced in low-viscosity or higher-viscosity form and are diluted in a water-dilutable organic auxiliary solvent a), partially or completely neutralized with a base b) and diluted normally or in inverse form with water, and thereby converted into a water-dilutable form.

Suitable components a) include, for example, water-dilutable mono- or polyhydric alcohols or glycols, for example ethanol, n-propanol, isopropanol, n-butanol, isobutanol, ethylene glycol, diethylene glycol, triethylene glycol, propylene glycol and glycerol, water-dilutable monoethers of polyhydric alcohols, for example methoxypropanol or methoxybutanol, and water-dilutable glycol ethers, for example butylglycol or butyldiglycol.

As components b) for the neutralization of the acid groups, it is possible to use both organic bases and inorganic bases. It is preferred to employ, for example, primary, secondary and tertiary amines, for example ethylamine, propylamine, dimethylamine, triethylamine, dibutylamine, dimethylisopropylamine, cyclohexylamine, benzylamine, morpholine and piperidine, with particular preference being given to amino alcohols, for example N,N-diethylaminoethanol, N,N-dimethylaminoethanol, ethanolamine, diethanolamine, triethanolamine, 2-amino-2methylpropanol or 2-dimethylamino-2-methyl-1-propanol.

Neutralization is carried out so as to give, after dilution with water, stable solutions or dispersions generally having a pH of between 6 and 9, preferably from 7 to 8.

The copolymers (2) according to the invention are distinguished by their content of epoxide groups, which in general leads to an epoxide number of from 0.1 to 20, preferably from 0.3 to 10 and, in particular, from 0.5 to 7 g of epoxide oxygen/100 g, and by their melt viscosity of from 500 to 50,000, preferably from 1000 to 35,000 and, in particular, from 2000 to 25,000 mPa.s, measured at 170° C.

The copolymers (2) are cooled after polymerization, and solidified to give a solid mass which can be comminuted. Glycidyl-containing products of this kind may be used in conjunction with carboxyl-containing curing agents for the preparation of powder coatings. Curing agents which can be used include, in particular, dibasic acids, their anhydrides and polyanhydrides, used individually or in a mixture. The polyanhydrides can also be employed in a mixture with hydroxycarboxylic acids.

According to a further embodiment of the invention, it is possible to cure a copolymer (1) or (2) prepared in accordance with the invention which still contains free COOH groups using triglycidyl isocyanurate.

The present invention also relates to coating compositions which comprise one or more of the copolymer according to the invention as binders. As examples of such compositions there may be mentioned high-solids 1-component coating materials, high-solids 2-component coating materials, aqueous 1-component coating materials, aqueous 2-component coating materials and powder coating compositions.

The copolymers according to the invention are also highly suitable for pigmented topcoats and for fillers.

The copolymers may be cured in any desired manner. In these high-solids and aqueous coating compositions, suitable curing components for 1-component coating materials include reaction products of formaldehyde with amino resin formers such as urea, alkyleneureas, melamine and guanamines, or ethers thereof, with lower alcohols such as methanol or butanol, and also polyisocyanates, and compounds which contain anhydride groups, individually or in combination. The cross-linking agent is usually in each case added in a quantity such that the molar ratio of the OH groups of the copolymer to the reactive groups of the cross-linking agent is between 0.3:1 and 3:1.

Formaldehyde adducts which are suitable as curing components are preferably those derived from urea, melamine and benzoguanamine, and the completely or partially etherified formaldehyde-amine adducts. Curing agents which are employed with particular preference are melamine-formaldehyde adducts which are partially or completely etherified with aliphatic alcohols of 1 to 4 carbon atoms. Examples of such commercially available curing agents are ®Maprenal MF 900, VMF 3921 W and VMF 3926 (Cassella AG) and ®Cymel 303 and 327 (Cytec). Suitable mixing ratios are in the range from 50 to 90 parts of copolymer to from 50 to 10 parts of amine-formaldehyde adduct, based on solid resin.

Suitable formaldehyde-phenol adducts and derivatives thereof can also be used as curing agents.

In the presence of acids, for example p-toluenesulfonic acid, these cross-linking agents lead to curing of the coating. Heat-curing can be undertaken in a conventional manner at temperatures of from 80 to 200° C. in, for example, from 10 to 30 minutes.

Compounds suitable for curing the high-solids products according to the invention in a 2-component coating material with cross-linking, especially at moderate temperatures or at room temperature, include polyisocyanates. Suitable polyisocyanate components are all aliphatic, cycloaliphatic or aromatic polyisocyanates which are known from polyurethane chemistry, individually, or in mixtures. Examples of highly suitable compounds are low molecular weight polyisocyanates such as, for example, hexamethylene diisocyanate, 2,2,4and/or 2,4,4-trimethyl-l,6-hexamethylene diisocyanate, dodecamethylene diisocyanate, tetramethyl p-xylylene diisocyanate, 1,4-diisocyanatocyclohexane, 1-isocyanato- 3,3,5-trimethyl-5-isocyanatomethylcyclohexane (IPDI), 2,4'- and/or 4,4'-diisocyanatodicyclohexylmethane, 2, 4' and/or 4,4'-diiso-cyanatodiphenylmethane or mixtures of these isomers with their higher homologs, as are accessible in a manner known per se by phosgenization of aniline-formaldehyde condensation products, or else 2,4and/ or 2,6-diisocyanatotoluene, or any desired mixtures of such compounds.

Preference is given to employing derivatives of these simple polyisocyanates, as are conventional in coatings technology. These include polyisocyanates which contain, for example, biuret groups, uretdione groups, isocyanurate groups, urethane groups, carbodiimide groups or allophanate groups, and as are described, for example, in EP 0 470 461. Modified polyisocyanates which are particularly preferred include N,N',N"-tris(6-isocyanatohexyl)biuret and its mixtures with its higher homologs, and N,N',N"-tris(6-isocyanatohexyl)isocyanurate, and its mixtures with its higher homologs containing more than one isocyanurate ring.

Crosslinking may be catalyzed by the addition of organometallic compounds, such as tin compounds, and—if desired—tertiary amines, preferably diethylethanolamine. Examples of appropriate tin compounds are dibutyltin dilaurate, dibutyltin diacetate and dibutyloxotin.

For curing at elevated temperature, additional suitable compounds include capped polyisocyanates, polycarboxylic acids and their anhydrides.

Likewise, aqueous 2-component coating compositions are usually cured with capped polyisocyanates, polycarboxylic acids or their anhydrides at moderate temperatures.

In the industrial, plastics and wood products sector as well, use is increasingly being made of modern coating compositions. Thus, for example, the above-mentioned high-solids binders can be employed in these sectors too as clearcoats or pigmented topcoats. It should also be mentioned that the water-thinnable acrylic resins play an important role as clearcoats or pigmented topcoats in the 2-component area for the coating of metals, plastics and wood.

Consequently, the examples which follow from the automotive sector are intended only to illustrate the invention in more detail without, however, limiting it.

In coating compositions prepared with the copolymers (1) according to the invention, it is also possible for other auxiliaries and additives which are conventional in coatings technology and which have not been mentioned beforehand to be present. These include, in particular, catalysts, leveling agents, silicone oils, plasticizers, such as phosphates and phthalates, pigments such as iron oxides, lead oxides, lead silicates, titanium dioxide, barium sulfate, zinc sulfide, phthalocyanine complexes, fillers such as talc, mica, kaolin, chalk, ground quartz, ground asbestos, slate flour, various silicic acids and silicates, viscosity-regulating additives, matting agents, UV absorbers, light stabilizers, antioxidants, peroxide scavengers, defoamers, wetting agents and active diluents/reactive diluents.

The coating compositions can be applied to the respective substrate by known methods, for example by brushing, dipping, flow coating or with the aid of rollers or doctor knives, but especially by spraying. They can be applied under hot conditions and, if desired, can be brought into a ready-to-apply form by injection of supercritical solvents e.g., $CO_2$).

The copolymers (1) according to the invention can also be employed as curing agents for various synthetic resins, especially epoxy resins and dispersions of these resins.

The powder coating compositions according to the invention preferably comprise at least one copolymer (2) according to the invention and a curing agent.

Examples of the dibasic aliphatic acids used in the invention as curing agents are adipic acid, pimelic acid, suberic acid, azelaic acid, sebacic acid, malonic acid, succinic acid, glutaric acid, 1,12-dodecanedioic acid, etc. The anhydrides of these acids can also be used, for example glutaric anhydride, succinic anhydride, and polyanhydrides of these dicarboxylic acids. These polyanhydrides are obtained by intermolecular condensation of the above-mentioned dibasic aliphatic dicarboxylic acids. Examples are adipic (poly)anhydride, azelaic (poly)anhydride, sebacic (poly)anhydride, dodecanedioic (poly)anhydride, and the like. The polyanhydrides have a weight-average molar mass (polystyrene standard) of from 1000 to 5000 g/mol. The polyanhydrides may also be modified with polyols, as described in EP 0 299 420. The polyanhydrides are solid at room temperature.

The polyanhydrides may also be employed as curing agents in a mixture with the dibasic aliphatic dicarboxylic acids, or in a mixture with hydroxycarboxylic acids which possess melting points between 40° C. and 150° C., for example 12-hydroxystearic acid, 2- or 3- or 10-hydroxyoctadecanoic acid, and 2-hydroxymyristic acid.

The quantity of the anhydrides and acids employed as curing agents, based on the acrylic resin, may vary over a wide range and depends on the number of epoxide groups in the acrylic resin. In general, the chosen molar ratio of carboxyl groups or anhydride groups to epoxide groups is from 0.4 to 1.4:1, preferably from 0.8 to 1.2:1.

The powder coating may comprise conventional pigments and fillers. Furthermore, it may also comprise a catalyst, in order to increase the rate of cross-linking and to lower the curing temperature. Suitable catalysts are tetraalkylammonium or phosphonium salts, imidazoles, tertiary amines, metal salts of organic carboxylic acids, or phosphines. In most cases, however, the presence of a catalyst is unnecessary.

The powder coating may also contain various additives which are commonly employed in powder coatings, especially degassing agents such as, for example, benzoin, which is employed in general in quantities of from 0.1 to 3%. It is also possible to use leveling agents, such as oligomeric poly(meth)acrylates, examples being polylauryl (meth)acrylate, polybutyl (meth)acrylate, poly-2-ethylhexyl (meth) acrylate, or fluorinated polymers or polysiloxanes. In order to improve the weathering resistance, the known UV absorbers and antioxidants can be added.

Generally, the components of the powder coating are first of all mixed in dry form and then extruded using a twin-screw extruder at a temperature of from 80° to 130° C., preferably from 80° to 100° C. After cooling and comminution, the extrudate is ground in a mill to a target average particle size of from 20 to 90 nm, preferably from 40 to 70 nm. Any oversize present can be removed by screening.

The powder coating is applied by one of the conventional methods, for example by electrostatic or triboelectric spraying. Following application it is generally cured at a temperature of from 120° to 200° C., with the curing temperature preferably being from 130° to 160° C.

The powder coating is particularly suitable as a clearcoat on aqueous basecoats. 2-Coat finishes are obtained of extraordinary surface smoothness, gloss and resistance to chemicals and weathering.

The invention is illustrated by the following non-limiting examples.

EXAMPLES

I.a) Preparation of the copolymers (1) (high-solids binders)

The glycidyl ester of an α,α-dialkylalkanemonocarboxylic acid [e.g., glycidyl ester of ®Versatic 10 or 5 acid (tradename: Cardura® E 10 or Cardura® E 5, Shell Chemicals)] (in some cases in solvent or solvent mixtures) is charged to a reactor equipped with stirrer mechanism, inert gas inlet, heating and cooling system and feed device, and is heated under inert gas to the desired temperature. Then the monomer mixture according to Table 1 (in some cases in solvent or solvent mixtures) is metered in at a uniform rate, separately or together with initiator or initiator mixtures (in some cases in solvent or solvent mixtures) over the course of 6 hours. Afterpolymerization is carried out for 2 hours until a degree of conversion of at least 95% has been reached.

If the solids content by mass after polymerization is below 97.5%, the batch is reseeded before or during afterpolymerization with 1/10 of the initial quantity of initiator (with or without solvent), or the residual monomers (including initiator fragments and solvents) are separated off in a vacuum distillation.

The copolymers are diluted in appropriate solvents or solvent mixtures.

All copolymers are filtered through an appropriate filter device. The precise batches for the preparation of the copolymers in terms of parts by weight, reaction conditions and characteristics of the products can be seen from the following Table 1.

TABLE 1

Preparation and properties of the copolymers (1A)

| Batch (parts) | Copolymer 1 (comparison) | Copolymer 2 (comparison) | Copolymer 3 | Copolymer 4 |
|---|---|---|---|---|
| Glycidyl ester (Cardura ® E10) | 24.18 | 22.45 | 24.18 | 22.4S |
| Acrylic acid | 3.54 | — | 3.54 | — |
| Methacrylic acid | 7.69 | 10.72 | 7.69 | 10.72 |
| Hydroxyethyl methacrylate | 19.85 | 18.05 | 19.85 | 18.05 |
| Polypropylene glycol (n = 5 or 6) monomethacrylate | — | 0.95 (n = 5) | — | 0.95 (n = 5) |
| Isobornyl methacrylate | 14.89[+] | 10.07[+] | 14.89[*] | 10.07[*] |
| Isobornyl acrylate | — | — | — | — |
| Methyl methacrylate | 7.18 | 4.82 | 7.18 | 4.82 |
| Styrene | 22.67 | 32.94 | 22.67 | 32.94 |
| Initiator (DTAP) | 1.50 | 1.50 | 1.50 | 1.50 |
| Polymerization temperature (°C.) | 170 | 175 | 170 | 175 |
| SC (%) after polymerization | 97.2 | 98.1 | 98.1 | 97.8 |
| after distillation | 98.4 | — | — | — |
| SC (%) s.f. (in butyl acetate) | 70.1 | 70.4 | 70.0 | 70.2 |
| Acid number (mg KOH/G SR) | 22.3 | 23.3 | 23.0 | 22.8 |
| Hydroxyl number (mg KOH/g SR) | 134.8 | 136.0 | 135.1 | 133.1 |
| Viscosity (mPa · s), 23° C. (s.f.) | 3280 | 5860 | 3320 | 5790 |
| Viscosity (mPa · s), 23° C. (50% strength in BuAc) | 51 | 58 | 52 | 56 |
| GPC (PS calibration) | | | | |
| $M_w$ (g/mol) | 3800 | 4380 | 3860 | 4320 |
| $M_w$ (g/mol) | 1780 | 2160 | 1840 | 2160 |
| $U = M_w/M_n$ | 2.1 | 2.0 | 2.1 | 2.0 |
| Hazen color number (DIN 53995) | 51 | 36 | 45 | 41 |
| Tg (DSC measurement, °C.) | 24 | 23 | 29 | 30 |
| Appearance | transparent | transparent | transparent | transparent |

[+]Isomer distribution in accordance with the conventional two-step process
[*]Isomer distribution according to the new one-stage process
SC: solids content by mass, SR: solid resin, s.f.: supply form
n: average degree of polymerization of the polypropylene glycol
Tg: glass transition temperature of the solid reisn, DSC-7 Perkin Elmer, 10 K/min
Initiator: DTAP: di-tert-amyl peroxide: (Interox ® DTAP) (Peroxid Chemie)
GPC: $M_w$, $M_n$ Millipore ® Waters Chromatographie System 860
Pump: model 590 RI detector: model 410 Column packing: Waters Ultrastyragel 2 × LINEAR + 1 × 500 Å
Solvent: tetrahydrofuran at 40° C. flow rate: 1 ml/min, concentration: 1% based on solids
Calibration: polystyrene (from PSS, Mainz)
Determination of the parameters: acid number, hydroxyl number, epoxide number and viscosity (for standards see "Analytische Bestimmungsmethoden" Analytical Determination Methods], brochure: Kunstharze Hoechst, 1982 edition, from Hoechst AG, Frankfurt/Main)
Hazen color number according to DIN 53995 (LTM1, Dr. Lange GmbH, Berlin)

The copolymers (1) to (4) prepared have extremely low number-average molar masses and extremely low solution viscosities (Ubbelohde: 50% strength in butyl acetate at 23° C.).

The glass transition temperatures are higher in the case of copolymers 3 and 4 by 5 and 7° C., respectively, than in the case of the comparison polymers (1) and (2).

b) Preparation of the copolymers (1) (water-dilutable binders)

The esters I are charged to a reflux apparatus and heated to 180° C. The monomer mixture II with the initiator III dissolved therein (see Table 2) is then metered in at a uniform rate under nitrogen over the course of 8 h. After-reaction is then allowed to take place at the same temperature for 2 h. The batch is subsequently cooled to 130° C., and then addition of the solvent IV is commenced. After the end of the addition, the batch is cooled to 80° C. and the neutralization amine V is added with stirring over the course of 1 h, and then the deionized water VI is added over the course of 2 h. The batch is then cooled with stirring to 25° C. and filtered.

TABLE 3

Preparation and properties of the copolymers (2)

| Batch (parts) | Copolymer 9 (comparison) | Copolymer 10 |
|---|---|---|
| Dimethyl maleate | 15.35 | 15.35 |
| Styrene | 45.02 | 45.02 |
| Isobornyl methacrylate | 23.52+ | 23.52* |
| Glycidyl methacrylate | 15.11 | 15.11 |
| Methyl methacrylate | 0.50 | 0.50 |
| Di-tert-butyl peroxide | 0.50 | 0.50 |
| Visc. (plate, cone, D = 100 s, 170° C.) (mPa · s) | 6800 | 6300 |
| Glass transition temperature (°C.) | 56 | 61 |
| $M_w$ (g/mol) | 7310 | 7280 |
| Epoxide number (g Ep-O/100 g) | 1.6 | 1.6 |
| Epoxide equivalent weight (g/mol) | 1000 | 1000 |

+Isomer distribution in accordance with the conventional two-step process
*Isomer distribution in accordance with the new one-step process

TABLE 2

Preparation and properties of copolymer (1B)

| Batch (parts) | | Copolymer 5 (comparison) | Copolymer 6 (comparison) | Copolymer 7 | Copolymer 8 |
|---|---|---|---|---|---|
| Diethyl maleate | I | — | 5.6 | — | 5.6 |
| Glycidyl ester (Cardura ® E10) | | 20.2 | 13.4 | 20.2 | 13.4 |
| Acrylic acid | II | 9.0 | 7.1 | 9.0 | 7.1 |
| n-Butyl acrylate | | 15.2 | — | 15.2 | — |
| 4-Hydroxybutyl acrylate | | — | 18.8 | — | 18.8 |
| 2-Hydroxyethyl methacrylate | | — | 9.3 | — | 9.3 |
| 2-Hydroxypropyl acrylate | | 9.6 | — | 9.6 | — |
| Isobornyl acrylate | | 23.0+ | — | 23.0* | — |
| Isobornyl methacrylate | | — | 29.1+ | — | 29.1* |
| Methyl methacrylate | | — | 6.5 | — | 6.5 |
| Styrene | | 23.0 | 10.2 | 23.0 | 10.2 |
| Di-tert-butyl peroxide | III | 1.5 | 1.5 | 1.5 | 1.5 |
| 1-Butanol | IV | 42.9 | 25.0 | 42.9 | 25.0 |
| N,N-Dimethylaminoethanol | V | 2.3 | — | 2.3 | — |
| 2-Amino-2-methyl-1-propanol | | — | 2.4 | — | 2.4 |
| Water | VI | 87.4 | 99.9 | 87.4 | 99.9 |
| Acid number (based on SC, calc.) | | 20.7 | 22.0 | 21.1 | 21.5 |
| Hydroxyl number (based on SC, calc.) | | 91.0 | 146.5 | 90.5 | 143.3 |
| Dilution (%, calc.) | | 70.0 | 80.0 | 70.0 | 80.0 |
| Degree of neutralization (%) | | 70.0 | 70.0 | 70.0 | 70.0 |
| Solids content (%, calc.) | | 43.0 | 44.0 | 43.0 | 44.0 |
| Viscosity (23° C., mPa · s) | | 2890 | 2610 | 2850 | 2640 |
| $M_w$ (g/mol) | | 28700 | 25600 | 28760 | 25510 |

+ Isomer distribution in accordance with the conventional two-step process
*Isomer distribution in accordance with the new one-step process c) Preparation of the copolymers (2) (powder coating binders)

Dimethyl maleate was initially introduced and was heated to 175° C. Then the monomer mixture together with the initiator was metered in at a uniform rate over the course of 7 h at 175° C. The batch was then held at this temperature for 1 h, and volatile constituents (initiator elimination products) were subsequently distilled off in vacuo (18 mbar). A solid, colorless resin was obtained. The compositions and characteristics are compiled in Table 3 (parts by weight).

The prepared copolymers 9 and 10 have low melt viscosities (170° C.). The glass transition temperature in the case of copolymer 10 is higher by 5° C. than in the case of the comparison polymer 9.

II. Preparation of the coating compositions

1.) Formulation of a high-solids 1-component coating material (automotive OEM)

30.0 parts by weight of a 75% strength solution of a commercial, highly reactive melamine-formaldehyde resin in isobutanol (®Maprenal VMF 3926), 0.75 part by weight of a UV absorber of the benzotriazole type (®Tinuvin 1130, 100%), 0.75 part by weight of a free-radical scavenger of the HALS type (®Tinuvin 292, 100%) were added with stirring to about 75 parts by weight of the prepared acrylic resin binder copolymer 1 or 3, respectively, and the components were thoroughly mixed.

With further stirring, the batch is diluted with a mixture of 7.5 parts by weight of isobutanol, 7.5 parts by weight of ®Solvesso 150 and 7.5 parts by weight of butylglycol.

The clearcoat is subsequently adjusted to an application viscosity of 25 seconds with the flow cup DIN 53211, 4 mm, 23° C.) using 19.0 parts by weight of a solvent mixture comprising 20 parts of ®Solvesso 100, 10 parts of xylene and 10 parts of methoxypropyl acetate.

0.15 part by weight of a slip additive (®Additol XL 121, 0.1% based on the overall coating material) is then admixed to the coating material with stirring.

The resulting clearcoats 1 and 3 finally possess an application solids content of 54% (measured in accordance with DIN 53216/1 h, 120° C.).

®Maprenal VMF 3926: highly reactive melamine-formaldehyde resin in isobutanol (from Cassella AG, Offenbach).
®Tinuvin 292 "HALS" (from Ciba Geigy, Basel).
®Tinuvin 1130 UV absorber (from Ciba Geigy, Basel).
®Additol XL 121, slip additive (from Hoechst AG, Frankfurt/Main).

2.) Formulation of a high-solids 2-component coating material (automotive refinish and industrial coating)

In order to prepare the curable coating compositions according to the invention, the components—consisting of a hydroxyl-containing copolymer or a mixture of two or more such copolymers or different hydroxyl-containing copolymers—are mixed with the auxiliaries and additives, solvents and cross-linking agents in the mixing ratio described in Table 4 and are adjusted with further diluent to the spray viscosity of from 20 to 21 seconds with the flow cup (DIN 53 211, 4 mm, 23° C.). For components of low viscosity this may be carried out without solvent, in which case heating to higher temperatures is carried out if desired. Products of higher viscosity are—if the curable mixtures are not employed as powder coatings—dissolved or dispersed in the above-mentioned diluents prior to mixing. In the case of pigmented systems, a pigment paste is first of all produced in a dispersion step from the corresponding pigments together with the copolymer or a mixture of two or more such or different copolymers, or a suitable, specific grinding resin in a dispersion apparatus of appropriate construction. This paste is mixed and made up by adding further diluents or additives which are typical for coating materials. If desired it is possible to admix further binder based on the copolymers according to the invention, or a foreign resin which is compatible with the other components of the coating system. The pot life and the properties of resulting films depend in this case on the process conditions, i.e., on the nature and quantity of the starting materials, metering of the catalyst, temperature regime, etc. Although curing is generally carried out noncontinuously, it is also within the scope of the invention to carry out the mixing of the components and the course of the reaction continuously, for example by means of an automatic coating device.

TABLE 4

Preparation of the high-solids clearcoats

| Batch | Copolymers | | | |
|---|---|---|---|---|
| | 1 | 2 | 3 | 4 |
| Appearance | transparent | transparent | transparent | transparent |
| SC (%) | 70.1 | 70.4 | 70.0 | 70.2 |
| OH number (mg KOH/g)/OH content (%) | 135/4.1 | 136/4.1 | 135/4.1 | 133/4.0 |
| Visc. 50% solution (mPa · s) | 51 | 58 | 52 | 56 |
| Binder | 82 | 82 | 82 | 82 |
| Tinuvin ® 292 | 0.5 | 0.5 | 0.5 | 0.5 |
| Tinuvin ® 1130 | 1.5 | 1.5 | 1.5 | 1.5 |
| Si oil LO 50%, 10% strength | 1 | 1 | 1 | 1 |
| Solvesso ® 100 | 1.5 | 1.5 | 1.5 | 1.5 |
| Xylene | 2.5 | 2.5 | 2.5 | 2.5 |
| BuAc | 11 | 11 | 11 | 11 |
| Desmodur ® N 3390 | 29.5 | 29.9 | 29.5 | 29.1 |
| Flow cup (DIN 53 211) (seconds) | 21 | 21 | 21 | 21 |
| Designation of coating material | Comparison coating 1 | Comparison coating 2 | Novel coating 3 | Novel coating 4 |

® Tinuvin 292 "HALS" (from Ciba Geigy, Basel)
® Tinuvin 1130 UV absorber (from Ciba Geigy, Basel)
Si oil LO 50% leveling agent silicone oil (from Wacker Chemie GmbH, Burghausen)
Desmodur ® N 3390 isocyanurate-containing polyisocyanate (from Bayer AG; Leverkusen)
BuAc: Butyl acetate 3.) Pigmented two-component coating materials In accordance with the information given in Table 5, two-component white paints are formulated. The paints carry the designation coating 5 and coating 6.

TABLE 5

Preparation of pigmented coating materials (white paints)

| Binder | Copolymer 2 (comparison) | Copolymer 4 |
|---|---|---|
| SC % | 70.4 | 70.2 |
| OH number/% OH | 136/4.1 | 133/4.0 |
| Binder | 55 | 55 |
| TiO$_2$ - 2310 | 29.2 | 29.2 |
| Bentone ® 34 (10% paste in xylene) | 2.5 | 2.5 |

TABLE 5-continued

Preparation of pigmented coating materials (white paints)

| Binder | Copolymer 2 (comparison) | Copolymer 4 |
|---|---|---|
| Additol ® XL 260 | 1 | 1 |
| Si oil LO 50%/10% | 1 | 1 |
| Solvesso ® 100 | 1.5 | 1.5 |
| BuAc | 5.2 | 5.2 |
| Xylene | 2.5 | 2.5 |
| Methoxypropyl acetate | 2.1 | 2.1 |
| Desmodur ® N 3390 | 20.0 | 19.5 |
| Binder: | 1:0.5 | 1:0.5 |
| Pigment | | |
| Flow cup (DIN 53 211) (seconds) | 21 | 21 |
| Coating designation | Coating 5 | Coating 6 |

$TiO_2$ - 2310 white pigment (from Kronos Titan GmbH, Leverkusen)
Bentone ® 34 antisettling agent (from Kronos Titan GmbH, Leverkusen)
Additol ® XL 260 (from Vianova GmbH, Graz)
Si oil LO 50% leveling agent silicone oil (from Wacker Chemie GmbH, Burghausen)
Desmodur ® N 3390 isocyanurate-containing polyisocyanate (from Bayer AG, Leverkusen)
BuAc butyl acetate 4.) Automotive refinishing filler In accordance with the information given in Table 6, two-component fillers are formulated. They carry the designation filler 1 and filler 2.

TABLE 6

Preparation of fillers (automotive refinish)

| Binder | Copolymer 1 (comparison) | Copolymer 3 |
|---|---|---|
| SC % | 70.1% | 70.0% |
| OH number/% OH | 135/4.1 | 135/4.1 |
| Binder | 18 | 18 |
| Butyl acetate | 15.7 | 15.7 |
| Methoxypropyl acetate | 12.4 | 12.4 |
| Bentone ® 34 10% | 5 | 5 |
| Additol ® XL 270 | 0.5 | 0.5 |
| Bayfeffox ® 316 (black) | 0.2 | 0.2 |
| Bayferrox ® 3920M (yellow) | 0.3 | 0.3 |
| Zn oxide NT/S | 2.2 | 2.2 |
| Talc AT ex | 6 | 6 |
| $TiO_2$ 2059 | 10.4 | 10.4 |
| Kaolin W | 18.4 | 18.4 |
| Zn phosphate ZP 10 | 8.5 | 8.5 |
| BuAc | 2.4 | 2.4 |
| Desmodur ® N 75% | 100 | 100 |
| | 7.4 | 7.4 |
| Binder: | 1:2.5 | 1:2.5 |
| Pigment | | |
| Flow cup (DIN 53 211) (seconds) | 21 | 21 |
| Coating designation | Filler 1 | Filler 2 |

Bentone ® 34 antisettling agent (from Kronos Titan GmbH, Leverkusen)
Additol ® XL 270 (from Vianova GmbH, Graz)
Bayferrox ® 316 (black)
Bayferrox ® 3920 (yellow) (from Bayer AG, Leverkusen)
Zn oxide NT/S
Zn phosphate (from Dr. Hans Heubach GmbH, Langelsheim)
Talc AT ex (from Norwegian Talc Deutschland GmbH, Bad Soden-Salmünster)
Kaolin W (from C. N. Erbslöh, Düsseldorf)
Desmodur ® N 75% polyisocyanate (from Bayer AG, Leverkusen)

5.) Formulation of an aqueous 1-component stoving clearcoat 11.86 parts of an aqueous solution of partially methylated melamine-formaldehyde resin (Maprenal® VMF 3921 w, 85% water, cross-linking agent) are initially introduced and 0.35 part of Additol® XW 392 is added in its supply form (leveling agent). To this mixture are added 96.4 parts of copolymers 5 or 7 (binder/melamine resin ratio, solid/solid, 80:20). Then 10 parts of a butyldiglycol/water mixture (1:1) and about 14 parts of deionized water are used to establish the spray viscosity of 18–20 s flow time, DIN 4 cup, 23° C. If necessary, the pH is adjusted to 8 using dimethylethanolamine. The deaerated coating material is applied to gradient metal panels in a wet film thickness of 150 μm and stored at from 100° to 160° C. for 20 minutes (coating 7 and comparison).

6.) Formulation of an aqueous 1-component solid-color storing topcoat

About 60 parts of copolymers 6 and 8 are initially introduced, mixed with 0.9 part of Additol® XL 250 (wetting agent, 0.5% based on overall coating material), 0.4 part of Additol® VXW 4973 (defoamer, 0.2% based on overall coating material), 40.2 parts of titanium dioxide CL 2310® (pigment, binder/pigment ratio: 100:70) and 6 parts of deionized water, ground for 20 minutes at 6000 rpm with cooling in a bead mill (2 mm beads), and combined with a premix comprising 13.5 parts Maprenal® VMF 3921 w (cross-linking agent, 85% in water), 0.3 part of Additol® XW 390 (leveling agent, 0.5% based on overall coating material) and 13.8 parts of deionized water, with gentle stirring. The deaerated coating material is applied to gradient metal panels in a wet film thickness of 150 μm, and stoved at from 100° to 160° C. for 20 minutes (coating 8 and comparison).

7.) Formulation of an aqueous 2-component clearcoat

Stock component:

0.6 part by weight of a commercial defoamer (®Additol XW 314 from Hoechst AG) is added to 99.4 parts by weight of copolymer 6 or 8 according to Table 2, and the mixture is stirred with a dissolver for 10 min.

Curing component:

16.5 parts by weight of ®Bayhydur LS 2032 (polyisocyanate curing agent based on hexamethylene diisocyanate, Bayer AG) and 16.5 parts by weight ®Bayhydur VPLS 2150 (polyisocyanate curing agent based on isophorone diisocyanate) are stirred together with 2.0 parts by weight of methoxypropyl acetate.

The curing agent solution is added with stirring (manual) to the stock component. The ratio of OH equivalents to NCO equivalents is 1:1, and the coating material has a solids content of 52.2% and a density (DIN 53 217, 23° C.) of 1.05 g/cm$^3$. It is then adjusted with demineralized water to a flow viscosity of 70 seconds in accordance with DIN 53 211, 23° C., cup #4 (coating 9 and coating 10 (comparison)).

8.) Preparation of a powder clearcoat 773 parts of copolymer 9 or 10, 185 parts of dodecanedioic polyanhydride and 3 parts of benzoin were first of all mixed in dry form. This mixture was then dispersed in the melt on a laboratory extruder at temperatures of 80°–120° C. After cooling and precomminution, the extrudate was ground on a blowing mill to an average particle size of 50 μm, to give a powder coating. The coarse particle fraction with particle sizes above 90 μm was removed by screening. The powder coating was sprayed using an electrostatic powder spraying unit at 60 kV onto degreased, earthed iron panels to give a layer thickness after stoving at 140° C./30 min of 60 μm (coating 11 and comparison).

III. Performance testing

1.) Performance testing of high-solids 1-component clearcoats (automotive OEM finishes)

The clearcoat prepared as described under II.1 and the comparison material are applied to gradient metal panels (special deep-drawn material with RP surface in accordance with DIN 1624) in a 150 μm wet film thickness, after having been deaerated, and are stoved at from 100° to 160° C. in a gradient oven for 20 minutes.

The clear and high-gloss coatings thus obtained were tested. The test results are compiled in Table 7 below.

TABLE 7

| Stoving conditons: 20 min at | 100° C. | 110° C. | 120° C. | 130° C. | 140° C. | 150° C. | 160° C. |
|---|---|---|---|---|---|---|---|
| König pendulum hardness Clearcoat of the invention | 152 s | 198 s | 206 s | 207 s | 209 s | 208 s | 210 s |
| Comparison clearcoat | 141 s | 195 s | 205 s | 207 s | 203 s | 202 s | 203 s |
| Erichsen indentation Clearcoat of the invention | n.m. | n.m. | n.m. | 4.3 mm | 4.3 mm | 2.3 mm | 2.1 mm |
| Comparison clearcoat | n.m. | n.m. | n.m. | 5.9 mm | 5.4 mm | 2.6 mm | 2.4 mm | n.m. not measured

Summary:

The tests described above show that the use of the acrylic resin binder according to the invention in the formulation of 1-component automotive clearcoats leads to high-solids clearcoats which are already highly reactive even in the lower stoving range (see pendulum hardness).

The resistance to xylene and sulfuric acid is outstanding in the case of both coating compositions.

2a) Performance testing of high-solids 2-component clearcoats (automotive refinish and industrial coating)

The coating systems described in II.2 were applied using 100 μm doctor knives to clean glass panels, and tested under the conditions of air drying and forced drying (45 minutes at 60° C.) (Table 8).

Summary:

In clearcoats formulated in accordance with conventional practice, the coating compositions according to the invention, without catalysis, have very high film hardnesses and resistance values with an extremely high drying speed (freedom from tack).

The topcoat holdout must be classified as being good.

2b) Performance testing of pigmented coating materials (white paints)

The coating systems produced as in II.3 were applied with a 100 μm doctor knife to cleaned glass panels and tested under the conditions of air drying and forced drying (45 minutes at 69° C.).

TABLE 8

Performance testing of high-solids clearcoats (automotive refinish industry)

| Coating designation | Coating 1 (comparison) | Coating 2 (comparison) | Coating 3 | Coating 4 |
|---|---|---|---|---|
| Appearance | transparent | transparent | transparent | transparent |
| Initial/pot life | 6 h/8 h gel. | 6 h/8 h gel. | 6 h/8 h gel. | 6 h/8 h gel. |
| Dust-dry time | 6' | 8' | 7' | 7' |
| Tack-free drying time | 2 h | 1.5 h | 1.5 h | 1.5 h |
| SC-1 h 125° C. (%) | 61.5 | 60.7 | 60.8 | 61.0 |
| Pendulum hardness (s) after | | | | |
| 24 h | 101 | 96 | 105 | 95 |
| 2 d | 134 | 141 | 144 | 153 |
| 5 d | 197 | 188 | 198 | 192 |
| 10 d | 221 | 205 | 215 | 212 |
| Resistance to premium-grade gasoline after 10 d in min | >30' | >30' | >30' | >30' |
| Pendulum hardness after 45'60° C. drying | | | | |
| 24 h | 166 | 171 | 172 | 179 |
| 2 d | 203 | 201 | 208 | 205 |
| 5 d | 219 | 208 | 218 | 216 |
| 45'60° C. drying premium-grade gasoline after 5 d in min | >30' | >30' | >30' | >30' |

König pendulum hardness SC solids content by mass in accordance with DIN 53 216 d days
h hour ' minutes gel. gelled

TABLE 9

Performance testing of the white paints (pigmented coating materials)

| Coating designation | Coating 5 (comparison) | Coating 6 |
|---|---|---|
| Initial/pot life | 21"/>24 h | 21"/24 h gel. |
| Dust-dry time | 15' | 11' |
| Tack-free drying time | 3.5 h | 3 h |
| SC-1 h 125° C. (%) | 65.3 | 65.0 |
| Pendulum hardness (s) after | | |
| 24 h | 63 | 70 |
| 2 d | 95 | 115 |
| 4 d | 122 | 135 |
| 5 d | 156 | 160 |
| 7 d | 181 | 191 |
| 10 d | 206 | 211 |
| Premium-grade gasoline after 10 d in min | >30 | >30 |
| Pendulum hardness after 45'/60° C. drying | | |
| 24 h | 111 | 123 |
| 2 d | 171 | 170 |
| 3 d | 192 | 186 |
| 5 d | 201 | 203 |
| Premium-grade gasoline after 5 d in min | >30 | >30 |

König pendulum hardness SC solids content by mass in accordance with DIN 53 216
" seconds, ' minutes, h hours, d days Summary:
In white paint formulations in accordance with those in practice, the coating compositions according to the invention exhibit rapid drying and increased pendulum hardnesses at the beginning of curing.

2c) Performance testing of fillers (automotive refinish)

The fillers produced as in II.4 were applied using a 200 μm doctor knife to clean glass panels, and were tested on the condition of air drying.

TABLE 10

Performance testing of the fillers

| Coating designation | Filler 1 (comparison) | Filler 2 |
|---|---|---|
| Pot life | 3 h | 2.5 h |
| SC-1 h, 125° C. (%) | 64 | 64.1 |
| Dry sandability after 6 h | good | very good |
| Solvent resistance Butyl acetate 1 min after 16 h | satisfactory | satisfactory | h hours
SC solids content determined in accordance with DIN 53 216

Summary:
Using one of the binders according to the invention, it is possible to formulate an automotive refinish filler with very good dry sandability.

3.) Performance testing of aqueous 1-component stoving clearcoats

The stoving clearcoats formulated in II.5 and applied gave nonyellowing films free from water boil and of good appearance.

| | | 100° C. | 110° C. | 120° C. | 130° C. | 140° C. | 150° C. | 160° C. |
|---|---|---|---|---|---|---|---|---|
| Pendulum hardness (s) | Comparison | 169 | 209 | 211 | 208 | 207 | 210 | 208 |
| | Coating 7 | 175 | 210 | 212 | 209 | 211 | 211 | 213 |

Summary:
The nonyellowing coating film according to the invention has even higher pendulum hardnesses. Both coating films exhibit high resistance to sulfuric acid, xylene and acetone.

The formulated water-thinnable stoving clearcoats are particularly suitable for the preparation of metallic finishes by the basecoat/clearcoat method.

4.) Performance testing of aqueous 1-component solid-color stoving topcoats

The solid-color stoving topcoats formulated in II.6 and applied gave nonyellowing films free from water boil and of good appearance.

| | | 100° C. | 110° C. | 120° C. | 130° C. | 140° C. | 150° C. | 160° C. |
|---|---|---|---|---|---|---|---|---|
| Pendulum hardness (s) | Comparison | 179 | 197 | 199 | 196 | 196 | 194 | 196 |
| | Coating 8 | 183 | 198 | 201 | 200 | 199 | 200 | 198 |
| Gloss 20° (%) | Comparison | 87 | 84 | 83 | 80 | 80 | 76 | 77 |
| | Coating 8 | 88 | 83 | 83 | 81 | 80 | 76 | 77 |

Summary:

The nonyellowing coating film according to the invention has even higher pendulum hardnesses and a good gloss.

The chemical resistance is good.

5.) Aqueous 2-component wood varnishes

The aqueous copolymers (1B) according to the invention were subjected to applications-related testing in aqueous, two-component clear wood varnish formulations. For this purpose, the aqueous binders were provided with a defoamer, admixed with a mixture of two polyisocyanate curing agents dissolved in an organic solvent, while stirring, their viscosity was adjusted, they were applied with a box knife to the various test substrates, and dried. The following individual tests were carried out (see Table 11):

a) Film clouding:

Visual assessment, test substrate glass, film drawn on in a wet film thickness of 100 μm, drying: evaporation for 5 min at 23° C./50% relative atmospheric humidity, then 15 min at 60° C.; evaluation scale: 0=completely clear and free of cracks, 5=milky cloudiness and/or severe cracks or surface defects.

b) Leveling:

Visual assessment, test substrate chipboard with true wood veneer (oak), film drawn on with wet film thickness of 100 μm, then evaporation for 5 min at 23° C./50% relative atmospheric humidity and drying for 15 min at 60° C., then intermediate sanding with sandpaper of coarseness 380, then film drawn on again with wet film thickness of 150 μm and evaporation/drying as before; evaluation scale: 0=smooth and defect-free, 5=highly undulating and disturbed.

c) Dust-drying: Testing with glass beads according to DIN 53 150, test substrate glass, film drawn on with wet film thickness of 100 μm, drying at 23° C./50% relative atmospheric humidity.

d) Development of pendulum hardness:

Testing of König pendulum hardness in accordance with DIN 53 157, test substrate glass, film drawn on with wet film thickness of 150 μm, drying at 23° C./50% relative atmospheric humidity.

e) Erichsen indentation: In accordance with DIN 53 156, test substrate Erichsen metal panel, film drawn on with wet film thickness of 150 μm, evaporation for 5 min at 23° C./50% relative atmospheric humidity, then 15 min at 60° C., then drying for 10 d at 23° C./50% relative atmospheric humidity; the parameter indicated is the indentation of the metal panel at which cracking is first ascertained in the dried coating.

f) Abrasion resistance:

Abrasion determined with the Taber abraser, test roll CS 17, overall stress 1 kg, after 1000 revolutions, test substrate steel panel, coating: film drawn on in a wet film thickness of 300 μm, then evaporation/drying as for e).

g) Chemical resistance: Testing of chemical resistance in accordance with DIN 68 861, part (1A), test substrate chipboard with true wood veneer (oak), coating: film drawn on in a wet film thickness of 100 μm, then evaporation for 5 min at 23° C./50% relative atmospheric humidity, then drying for 15 minutes at 60° C., then cooling, then intermediate sanding with sandpaper of coarseness 380, then film drawn on again with a wet film thickness of 150 μm, and evaporation/drying as described under e). Evaluation in accordance with DIN.

h) Useful processing time:

For this purpose, the two components were mixed and films were applied at regular intervals to glass or black/white contrast cards, and chemical resistance (glass) and gloss/cloudiness (contrast card) were tested. The processing time indicated is the time after mixing the components until deterioration in the chemical resistance, or a reduction in gloss, is observed. The clearcoat batches were still not gelled at these times.

TABLE 11

Performance testing of the aqueous 2-component clearcoats (coating of wood)

| Test | Property tested, units | Coating 9 (based on copolymer 8) | Coating 10 (based on copolymer 6, comparison) |
|---|---|---|---|
| a) | Film cloudness | 0 | 0 |
| b) | Leveling | 0 | 0 |
| c) | Dust-dry time [min] | 10 | 20 |
| d) | Pendulum hardness [s] | | |
| | after 1 h | 12 | 10 |
| | after 2 h | 19 | 17 |
| | after 4 h | 31 | 26 |
| | after 8 h | 70 | 53 |
| | after 1 d | 106 | 84 |
| | after 2 d | 136 | 112 |
| | after 6 d | 154 | 139 |
| | after 8 d | 157 | 144 |
| | after 12 d | 168 | 153 |
| e) | Erichsen indentation [mm] | 9.1 | 8.8 |
| f) | Abrasion [mg] | 26.8 | 27.7 |
| g) | Chemical resistance (selection) | | |
| | 16 h acetic acid | 0 | 0 |
| | 16 h citric acid | 0 | 0 |
| | 16 h sodium carbonate | 0 | 0 |
| | 16 h aqueous ammonia | 1 | 1 |
| | 16 h ethanol | 0 | 0 |
| | 16 h red wine | 0 | 0 |
| | 16 h coffee powder | 0 | 0 |
| | 16 h water | 0 | 0 |
| | 16 h acetone | 0 | 0 |
| | 16 h ethyl/butyl acetate | 0 | 0 |
| | 16 h mustard | 0 | 0 |
| | 16 h lipstick | 0 | 0 |
| | 16 h ballpoint ink | 0 | 0 |
| | 16 h stamping ink | 0 | 0 |
| | 16 h cleaning solution | 0 | 0 |
| | 16 h dibutyl phthalate | 0 | 0 |
| h) | Processing time [h] | 4 | 4 |

Summary:

Formulated in 2-component clearcoats in accordance with conventional practice, without catalysis, the coating compositions according to the invention have very high film hardnesses, rapid drying and very good chemical resistance.

6.) Testing of the powder clearcoats

| | Comparison | Coating 11 |
|---|---|---|
| Gel time (140° C.) | 191 s | 183 s |
| Flow distance at 140° C. (DIN 16916[a]) | 167 mm | 156 mm |

[a]Initial sample weight: 0.2 g; substrate: degreased steel panel; 1 min. horizontal, then 60° C. inclination Summary:

At the height of summer, the powder clearcoat 11 according to the invention has a higher blocking resistance than the comparison coating. The evenness of the stoving of both coatings must be classified as very good.

Although only a few exemplary embodiments of this invention have been described in detail above, those skilled in the art will readily appreciate that many modifications are possible in the exemplary embodiments without materially departing from the novel teachings and advantages of this invention. Accordingly, all such modification are intended to be included within the scope of this invention as defined in the following claims.

What is claimed is:

1. A copolymer prepared by polycondensation or free-radical polymerization of olefinically unsaturated monomers, wherein at least one of the monomers is an isomer mixture of a cyclic or polycyclic olefinically unsaturated compound, which mixture contains a mass fraction from 8 to 50 per cent of at least one isomer of the main component in addition to this main component.

2. A copolymer of olefinically unsaturated monomers as claimed in claim 1, wherein at least one of the monomers is an isomer mixture of esters of isobornyl alcohol with an α,β-olefinically unsaturated acid, the content of isoborneol in the isomer mixture being not more than 92%, that of isofenchyl alcohol being at least 3.5%, and that of pseudobornyl alcohol being at least 1%.

3. A copolymer as claimed in claim 1, obtained by reaction in the presence of one or more polymerization initiators of
   (1A) one or more glycidyl esters or glycidyl ethers and
   (1B) at least two olefinically unsaturated copolymerizable monomers, of which at least one
      (1B1) carries at least one carboxyl group and at least one
      (1B2) is the isomer mixture of a cyclic or polycyclic olefinically unsaturated compound.

4. A copolymer as claimed in claim 3, wherein component (1A) comprises one or more glycidyl esters of aliphatic saturated monocarboxylic acids having a tertiary or quaternary α-carbon atom.

5. A copolymer as claimed in claim 4, wherein component (1A) is selected from glycidyl esters of α-alkylalkanemonocarboxylic acids and α,α-dialkylalkanemonocarboxylic acids, each having 4 to 30 carbon atoms in the acid radical.

6. A copolymer as claimed in claim 1, obtained by reaction in the presence of one or more polymerization initiators of (2B) at least three olefinically unsaturated copolymerizable monomers,
   of which at least one is an aromatic vinyl compound,
   at least one either carries a glycidyl ester group or develops this group in the course of the reaction,
   and at least one (2B2) is the isomer mixture of cyclic or polycyclic olefinically unsaturated compound and,
   optionally (2A) at least one diester of an α,β-olefinically unsaturated dicarboxylic acid having 1 to 20 carbon atoms in the alcohol component of the ester.

7. A copolymer as claimed in claim 3, wherein component (1B) additionally comprises one or more compounds (1B3) selected from the group consisting of the hydroxyalkyl esters of α,β-olefinically unsaturated carboxylic acids.

8. A copolymer as claimed in claim 3, wherein component (1B) additionally comprises one or more compounds (1B4) selected from the group consisting of the esters of α,β-olefinically unsaturated carboxylic acids with monohydric aliphatic alcohols of 1 to 20 carbon atoms.

9. A copolymer as claimed in claim 3, wherein component (1B) further comprises one or more compounds (1B5) selected from the group consisting of olefinically unsaturated compounds which do not come under (1B1), (1B2), (1B3) selected from the group consisting of the hydroxyalkyl esters of α,β-olefinically unsaturated carboxylic acids, or (1B4) selected from the group consisting of the ester of α,β-olefinically unsaturated carboxylic acids with monohydric aliphatic alcohols of 1 to 20 carbon atoms.

10. A copolymer as claimed in claim 3, wherein component (1A) is present in a proportion by mass of from 3 to 50% and component (1B) is present in a proportion by mass of from 97 to 50%, based on the mass of the copolymer.

11. A process for the preparation of a water-dilutable polyacrylate dispersion, which comprises diluting a copolymer as claimed in claim 3 in a water-dilutable organic solvent to form a solution,
   carrying out partial or complete neutralization of the copolymer, and
   subsequently diluting the solution by adding water or subjecting it to dilution in inverse form by stirring it into water.

12. A copolymer as claimed in claim 6, wherein the compounds (2A) are used and selected from the dialkyl esters of α,β-olefinically unsaturated carboxylic acids of 1 to 10 carbon atoms, individually, or in a mixture.

13. A copolymer as claimed in claim 6, wherein component (2B) comprises one or more compounds (2B3) selected from esters of an α,β-olefinically unsaturated carboxylic acid with an alcohol component which contains a glycidyl group.

14. A copolymer as claimed in claim 6, wherein component (2B) comprises one or more compounds (2B4) selected from α,β-olefinically unsaturated carboxylic acids and acidic esters of α,β-olefinically unsaturated polycarboxylic acids, and wherein an ester of an aliphatic saturated monocarboxylic acid having a tertiary or quaternary α carbon atom and an epoxy-containing alcohol component is added before, during or after polymerization.

15. A copolymer as claimed in claim 6, wherein component (2B) comprises one or more compounds (2B4) selected from the compounds according to (1B1) which carries at least one carboxyl group;
   (1B3) selected from the group consisting of the hydroxyalkyl esters of α,β-olefinically unsaturated carboxylic acids;
   (1B4) selected from the group consisting of the esters of α,β-olefinically unsaturated carboxylic acids with monohydric aliphatic alcohols of 1 to 20 carbon atoms; and
   (1B5) which is an olefinically unsaturated compound other than (1B1), (1B3), or (1B4).

16. A copolymer as claimed in claim 6, wherein component (2A) is present in a proportion by mass of 0 to 60% and component (2B) is present in a proportion by mass of from 100 to 40%, based on the mass of the copolymer.

17. A process for the preparation of a copolymer as claimed in claim 1, which comprises polymerizing the monomers in the presence of one or more polymerization initiators selected from radical-forming compounds selected from the group consisting of aliphatic azo compounds, diacyl peroxides, alkyl per-esters, alkyl hydroperoxides, dialkyl peroxides and peroxydicarbonates, in each case individually or in a mixture.

18. A process for the preparation of a copolymer as claimed in claim 1, which comprises polymerizing the monomers in the absence of solvent.

19. A copolymer as claimed in claim 1, wherein the cyclic or polycyclic olefinically unsaturated compound comprises an acrylic compound.

20. A copolymer as claimed in claim 2, wherein the isomer mixture comprises between 50 and 92% of isoborneol, from 3.5 to 49% of isofenchyl alcohol, and from 1 to 46.5% of pseudobornyl alcohol.

21. A copolymer as claimed in claim 2, wherein the isomer mixture comprises between 50 and 90% of isoborneol, from 4 to 48.5% of isofenchyl alcohol, and from 1.5 to 46% of pseudobornyl alcohol.

22. A copolymer as claimed in claim 1, which is not made from styrene.

23. A copolymer as claimed in claim 1, wherein the cyclic or polycyclic olefinically unsaturated compound comprises an ester of aliphatic cyclic or polycyclic alcohol and $\alpha,\beta$-olefinically unsaturated acid.

24. A copolymer as claimed in claim 1, wherein the cyclic or polycyclic olefinically unsaturated compound comprises a mono- or polycyclic terpene hydrocarbon.

25. A copolymer as claimed in claim 1, which is an acrylate copolymer that has an OH number of from 40 to 250 mg of KOH/g, an acid number of greater than 1 mg of KOH/g, and a solution viscosity of from 10 to 2,000 mPa.s measured in a 50% strength solution at 23° C.

26. A copolymer as claimed in claim 10, wherein (1B) comprises 1 to 85% by mass of (1B2).

27. A copolymer as claimed in claim 10, wherein (1B) comprises 3 to 85% by mass of (1B2).

28. A copolymer as claimed in claim 1, which is an acrylate copolymer having an epoxide number of from 0.1 to 20, a glass transition temperature of more than 30° C., and a melt viscosity of from 500 to 50,000 mPa.s at 170° C.

29. A copolymer as claimed in claim 16, wherein (2B) comprises 1 to 85% by mass of (2B2).

30. A copolymer as claimed in claim 16, wherein (2B) comprises 2 to 50% by mass of (2B2).

31. A copolymer as claimed in claim 2, obtained by reaction in the presence of one or more polymerization initiators of (1A) one or more glycidyl esters or glycidyl ethers and (1B) at least two olefinically unsaturated copolymerizable monomers, of which at least one (1B1) carries at least one carboxyl group and at least one (1B2) is the isomer mixture of esters of isobornyl alcohol.

32. A copolymer as claimed in claim 2, obtained by reaction in the presence of one or more polymerization initiators of (2B) at least three olefinically unsaturated copolymerizable monomers, of which at least one is an aromatic vinyl compound, at least one either carries a glycidyl ester group or develops this group in the course of the reaction, and at least one is the isomer mixture of esters of isobornyl alcohol with an $\alpha,\beta$-unsaturated acid and, optionally (2A) at least one diester of an $\alpha,\beta$-olefinically unsaturated dicarboxylic acid having 1 to 20 carbon atoms in the alcohol component of the ester.

* * * * *